United States Patent [19]

Trimble

[11] Patent Number: 4,941,674
[45] Date of Patent: * Jul. 17, 1990

[54] TUBULAR BICYCLE FRAME

[76] Inventor: Brent J. Trimble, 8025 Sundi Way, Anchorage, Ak. 99502

[*] Notice: The portion of the term of this patent subsequent to Jul. 25, 2006 has been disclaimed.

[21] Appl. No.: 149,984

[22] Filed: Jan. 29, 1988

Related U.S. Application Data

[63] Continuation of Ser. No. 861,983, May 12, 1986, abandoned.

[51] Int. Cl.$^5$ .......................... B62K 3/02; B62K 19/02
[52] U.S. Cl. ................................... 280/281.1; 264/258
[58] Field of Search ................... 280/281.1, 288.2, 200, 280/210, 270, 274, 279; 264/258

[56] References Cited

U.S. PATENT DOCUMENTS

| | | | |
|---|---|---|---|
| 2,182,828 | 12/1939 | Stutsman | 280/281 R |
| 2,370,726 | 3/1945 | Hess | 280/281 R |
| 2,729,466 | 1/1956 | Giordani | 280/281.1 |
| 2,827,306 | 3/1958 | Roder | 280/281 R |
| 3,233,916 | 2/1966 | Bowden | 280/281 R |
| 3,375,024 | 3/1968 | Bowden | 280/281 R |
| 3,493,240 | 2/1970 | Jenks | 280/11.13 |
| 3,641,230 | 2/1972 | Jenks | 264/152 |
| 3,833,242 | 9/1974 | Thompson | 210/281 R |
| 3,884,521 | 5/1975 | Moore | 296/31 |
| 4,015,854 | 4/1977 | Ramond | 280/281 R |
| 4,230,332 | 10/1980 | Porsche | 280/288.1 |
| 4,264,389 | 4/1981 | Staub et al. | 156/156 |
| 4,368,897 | 1/1983 | Brown | 280/202 |
| 4,411,333 | 10/1983 | Bothwell | 180/219 |
| 4,471,020 | 9/1984 | McCarthy | 264/46.6 |
| 4,479,662 | 10/1984 | Defour | 280/281 R |
| 4,493,749 | 1/1985 | Brezina | 280/288.1 |
| 4,511,523 | 4/1985 | Hsu | 264/46.6 |
| 4,513,986 | 4/1985 | Trimble | 280/281 R |
| 4,529,216 | 7/1985 | Spekner | 280/281 R |
| 4,534,578 | 8/1985 | Keller | 280/281 B |
| 4,565,595 | 1/1986 | Whitener | 156/156 |
| 4,613,146 | 9/1986 | Sharp et al. | 280/288.2 |
| 4,650,620 | 3/1987 | Owen | 264/46.9 |
| 4,657,795 | 4/1987 | Foret | 428/38 |

FOREIGN PATENT DOCUMENTS

| | | | |
|---|---|---|---|
| 944173 | 6/1956 | Fed. Rep. of Germany | 280/281 R |
| 950982 | 9/1956 | Fed. Rep. of Germany | |
| 2455141 | 3/1975 | Fed. Rep. of Germany | |
| 2453135 | 5/1975 | Fed. Rep. of Germany | |
| 475337 | 5/1915 | France | 280/281 R |
| 877814 | 1/1948 | France | 280/281 R |
| 1367704 | 6/1964 | France | |
| 2458445 | 2/1981 | France | 280/281 R |
| 2487769 | 2/1982 | France | 280/281 R |
| 1163835 | 7/1986 | Japan | |
| 191124 | 8/1937 | Switzerland | |
| 3568 | of 1894 | United Kingdom | |
| 902 | of 1898 | United Kingdom | |
| 303619 | 11/1927 | United Kingdom | |
| 591926 | 9/1947 | United Kingdom | |
| 1361394 | 7/1974 | United Kingdom | |
| 2117333 | 10/1983 | United Kingdom | |

OTHER PUBLICATIONS

Article from the Anchorage Daily News, dated May 13, 1985.

*Primary Examiner*—Mitchell J. Hill
*Attorney, Agent, or Firm*—Pollock, Vande Sande & Priddy

[57] ABSTRACT

A bicycle frame of streamlined and aerodynamically shaped tubular members has the form of two open triangles with a common side. The entire frame may be formed as one continuous unit with a plurality of hollow junctions each common to two or more members for supporting a front wheel assembly, a pedal and chain wheels assembly, a seat assembly and a rear wheel assembly. The frame may be covered or visually open from the side. The tubular seat column member has a rear wall which is curved longitudinally with a radius that follows the circumference of the rear tire. The longitudinally curved rear wall also is concave in transverse cross-section to follow the transverse shape of the outer surface of the tire. One or more of the tubular frame members, including a pair of rear seat stays and a pair of rear chain stays may have non-circular aerodynamic shapes in transverse cross-section.

34 Claims, 2 Drawing Sheets

TUBULAR BICYCLE FRAME

This application is a continuation, of application Ser. No. 861,983, filed May 12, 1986 abandoned.

TECHNICAL FIELD

The present invention relates to an improved frame for high performance bicycles. More particularly, the invention provides an unusually light bicycle frame of a tubular construction having unexpected strength and durability and low aerodynamic drag.

BACKGROUND OF THE INVENTION

Conventional bicycle frames have been built from individual tubes which are secured together by welding or other fastening means to make up a composite frame assembly. Such tubes are relatively heavy, having been made by extrusion or by rolling and seaming of a metal alloy.

Conventional bicycle frames also may be of the monocoque type wherein the structural support is provided by a stressed outer skin assembled over internal stiffening ribs and other structural elements. Monocoque frames may have aerodynamic advantages over conventional tubular frames due to the aerodynamic shape and unitary nature of the outer skin.

Conventional tubular frames and conventional monocoque frames both have the disadvantage of requiring the fastening together of numerous structural pieces that are expensive to make and assemble. For example, monocoque frames require the assembly of a large number of structural support elements, including shear webs, reinforcing angles, reinforcing blocks and strips, and joining blocks. There support elements must then be covered by a stress carrying outer skin. One such monocoque bicycle frame is described in U.S. Pat. No. 4,513,986 issued Apr. 30, 1985.

DISCLOSURE OF THE INVENTION

The bicycle frame of the present invention advantageously combines a lightweight tubular structure with aerodynamic shapes that substantially reduce aerodynamic drag. The bicycle frame carriers a steering support tube for rotatably supporting a handle bar and front fork assembly on which a front wheel may be mounted in conventional fashion. The frame also carries a seat support tube for supporting a seat assembly, a pedal support tube for supporting a pedal crank and chain wheel assembly, and rear dropouts for supporting opposite sides of a rear wheel assembly.

In the description which follows, the term member is taken to mean that portion of the unitary bicycle frame structure which most nearly corresponds to a frame tube or stay from a conventional bicycle frame.

The interconnected structural components of the frame include a tubular top member connecting and extending between the steering support tube and the seat support tube, a tubular seat column member connecting and extending between the seat support tube and the pedal support tube, a pair of chain stay members one on either side of the rear wheel assembly connecting and extending between the pedal support tube and the rear wheel dropouts, and a pair of seat stay members one on either side of the rear wheel assembly connecting and extending between the seat support tube and the rear wheel dropouts. The opposing chain stay members, the opposing seat stay members and the opposing rear dropouts form a fixed rear fork for receiving and supporting the rear wheel assembly.

The tubular top member, the tubular down member and the tubular seat column member form an open front triangle, and the tubular seat column member, the pair of tubular chain stay members and the pair of tubular seat stay members form an open rear triangle. The seat column member provides a common side for the front triangle and the rear triangle and the outer edges of the two other sides of the front triangle and the outer edges of the other two sides of the rear triangle define the outline of the geometry of the frame as viewed from one side of the frame.

The seat column member preferably has a rear tube wall which follows a smooth curve parallel to the outer circumference of the tire of the rear wheel assembly and is concave in transverse cross-section so as to follow the transverse radius of curvature of the tire of the rear wheel assembly. The concave transverse cross-section is preferably semi-circular in shape so as to extend around and provide clearance for the tread portion of bicycle tires with either rounded or oval tread shapes as viewed in transverse cross-section. These features of the seat column member eliminate the need for an additional rear fender piece as employed in conventional bicycles.

The bicycle frame of the invention most preferably is a unitary frame structure of integrally united tubular frame members. To provide this unitary structure, the joint between each of the tubular members comprises a hollow common junction. Thus, a hollow common junction is provided between the tubular top member and the tubular down member for carrying the steering support tube. Another hollow common junction is provided between the tubular down member, the tubular seat column member and the pair of tubular chain stay members for carrying the pedal support tube. A further common hollow junction is provided between the tubular top member, the tubular seat column member and the pair of tubular seat stay memberss for carrying the seat support tube. Still further hollow common junctions are provided between each tubular chain stay member and the corresponding tubular seat stay member for carrying the corresponding slotted rear dropout, one on either side of the rear wheel assembly.

While a totally unitary frame is most preferred, it is contemplated that each of the tubular members may be made separately and then fastened together into an assembled structure. Also, two or more of these members may be formed together and integrally united to provide a unitary frame portion having a hollow common junction between connected tubular members. For example, the tubular members forming the front triangle of the frame may be integrally united to form a unitary frame portion having a hollow common junction between the tubular top member and the tubular down member, a hollow common junction between the tubular down member and the tubular seat column member, and a hollow common junction between the tubular top member and the tubular seat column member. Similarly, the bicycle frame may comprise an integrally united unitary rear triangle portion having a hollow common junction between the tubular seat column member and the pair of tubular chain stay members, a hollow common junction between the tubular seat column member and the pair of tubular seat stay members, and a pair of hollow common junctions one between the tubular chain stay member and the tubular seat stay member on one side of the rear wheel assembly and the other between the tubular chain stay member and the tubular seat member on the opposite side of the rear wheel assembly.

The foregoing unitary frame structures may be made of synthetic resin, molded synthetic resin being preferred. The synthetic resin is preferably an epoxy type resin with a hardener component and a resin component that are mixed shortly before the resin is used. Where molded synthetic resin is used, it is preferably reinforced with a fibrous material impregnated with the synthetic resin. Such fiber reinforced synthetic resin material is commonly referred to as fiberglass. The fibers may be either woven or unwoven fibers, unidirectional unwoven fibers being preferred. A preferred composition of the fibrous material is comprised of one-third glass fibers, one-third Dupont Kevlar fibers, and one-third carbon fibers.

The preferred method of molding the unitary frame structure of the invention employs a female molding unit having three mold pieces, namely, a right side piece, a left side piece and a rear piece. The right and left side mold pieces have a shape corresponding to the outline of the geometry of the frame as viewed from the right and left sides, respectively. The third piece of the frame has a shape corresponding to the rear wall of the seat column member and the inside opposing walls of the pair of chain stay members and the pair of seat stay members. In molding the frame, successive layers of resin impregnated fibers are laid up in each of the mold pieces, 4–6 layers being preferred to provide corresponding sections of composite material for the frame wall. In laying up these wall section approximately one-half inch of each layer of impregnated fibrous material extends (projects) beyond the edges of both the left and right mold pieces so as to form an elongated junctive of overlapping layers rom the edge portions of the wall sections adjacent to each other when these mold pieces are fastened together while the resin is still tacky and uncured. The composite wall section laid up in the rear mold piece similarly extends (projects) beyond the edges of this piece, preferably for about one-fourth to one-half inch so as also to form a juncture of overlapping layers from the edge portions of the wall sections adjacent to each other when the rear piece is fastened between the corresponding rear portions of the right and left side pieces of the mold. When pressed and cured as described below, the overlapping layers provide a continuous frame wall bridging the joints between the respective mold pieces.

Although the overlapping layers bridging the mold pieces may be pressed together by running a rod or the like down each tubular member within its mold section before curing, this is preferably accomplished by an appropriately shaped bladder of polyethylene that is pressurized with air after the material for the entire bicycle frame has been laid up and the mold pieces have been fastened together to form the composite mold unit. In its deflated condition, this bladder substantially follows the outline of the geometry of the bicycle frame and is placed in one of the side pieces of the mold prior to assembly of the mold pieces together. After the mold pieces are assembled and secured in position by appropriate fasteners, the bladder is pressurized with air so as to firmly press the overlapping edge portions of the adjacent sections of frame material firmly against the abutting walls of the mold. The resin portion of the frame material thereafter is cured with the bladder pressurized. This form pressure molded junctions between the adjacent sections of frame material and provides a continuous frame wall of resin and layered reinforcing fibers which extends smoothly and uniformly across the joints between the abutting surfaces of the mold pieces.

After curing has been completed, the mold pieces are unfastened and the unitary frame structure is removed. The bladder inside the molded frame may either be deflated and removed from one of the openings in the frame, such as that for receiving the seat tube, or the bladder may be left in place as it is very light. When the bladder is inflated it has substantially the same shape and geometric outline as the unitary bicycle frame except its dimensions are of the smaller size required to fit within the hollow interior of the frame.

Where unidirectional fibers are used for the tubular top member and the tubular down member, about one-fourth to about one-half of these fibers are positioned at an angle between 0° to 45°, preferably about 45°, relative to the longitudinal axis of these elongated tubular members, with the remaining fibers being generally parallel to this longitudinal axis. Such orientation of the unidirectional fibers is believed to improve the strength of these members for carrying bending and torsional stresses. Although the unidirectional fibers are preferably parallel to the longitudinal axis when used as reinforcing in the tubular seat column member, the tubular chain stay members and the tubular seat stay members, these fibers also may be placed at angles between 0° and 45°, preferably about 45°, relative to the longitudinal axes of these members.

One or more of the tubular frame members may be further reinforced for carrying stress loads by filling the hollow tube interior with a substantially rigid core of a foamed synthetic resin such as an expandable styrofoam or polyurethane foam, the latter being preferred because of its resistance to heat and to degradation by petroleum type chemicals. Such internal reinforcement is provided by placing within the hollow interior of the tubular member or members a liquid resin composition containing a foaming agent. This resin composition is expanded and cured in place so as to substantially fill the hollow interior of the tubular member or members and any common hollow junctions therebetween with a substantially rigid foam core.

The advantage of a substantially rigid core of foamed synthetic resin within a tubular member is that the wall thickness of the tubular member may be reduced by as much as about one-sixth to about one-tenth. For example, a tubular member of resin impregnated fiber with a wall thickness of about 80 mils has about the same strength as a tubular member of the same material with a wall thickness of about 70 mils and filled with a substantially rigid core of synthetic resin foam.

Each of the tubular members of the frame preferably have an aerodynamic cross-sectional shape, which may be circular but more preferably is non-circular. This aerodynamic cross-sectional shape preferably extends along a major portion of the length of the elongated tubular members, more preferably over substantially the entire length thereof. The preferred aerodynamic shapes are substantially symmetrical relative to an imaginary plane in which both the front and rear wheels rotate, preferably the plane passing through substantially the center of the geometric cross-sectional shape of the tire carried by the wheel assembly.

In the preferred aerodynamic shapes for the tubular top member, the tubular down member, and the tubular seat stay members, the outer surfaces of these members are preferably substantially parallel. On the other hand, the rear surface of the tubular seat column member preferably follows both the circumference and the cross-sectional outline of the rear tire carried by the rear wheel assembly as previously explained with reference to the rear wall of this member. The leading edge of the tubular seat column member is preferably straight. The outer surfaces of the tubular chain stay members preferably taper rearwardly with reference to both the "x" and "y" axes of a plane transverse to the longitudinal axes of these members. The cross-sectional shapes of the walls of each of these members are shown in the accompanying drawings.

The front and rear triangles together form a bicycle frame which joins a tube for supporting the front fork, a tube for supporting the pedal crank axle, a tube for supporting the seat post and a pair of dropouts for supporting the hubs of the rear wheel assembly. These triangles may be visually open from the side. However, these triangles also may be covered with an aerodynamic skin which may appear similar to the skin of a monocoque bicycle frame. However, such a skin over the frame of the present invention does not carry the stress loading of a monocoque skin.

The present invention provides a bicycle frame having unusually low weight while providing unexpectedly high levels of rigidity and durability. The preferred one piece design further provides unusually low aerodynamic drag of a level achievable in the past only with bicycle frames of the monocoque type. The preferred one-piece tubular structure also eliminates problems of joint failures and excessive stresses which have arisen in the past when bicycle frames have utilized tubular members and other frame components of dissimilar materials.

The rigidity and durability of the bicycle frame of the invention is believed to be enhanced particularly by having the forward ends of the chain stays and the forward ends of the seat stays formed integrally with the tubular seat column member, and the rear ends of the chain stays formed integrally with the rear ends of the seat stays to provide common junctions with recesses for receiving and supporting the slotted rear dropouts.

BRIEF DESCRIPTION OF THE DRAWINGS

The invention may be further understood with reference to the accompanying drawings in which.

DESCRIPTION OF PREFERRED EMBODIMENT

Figure 1:
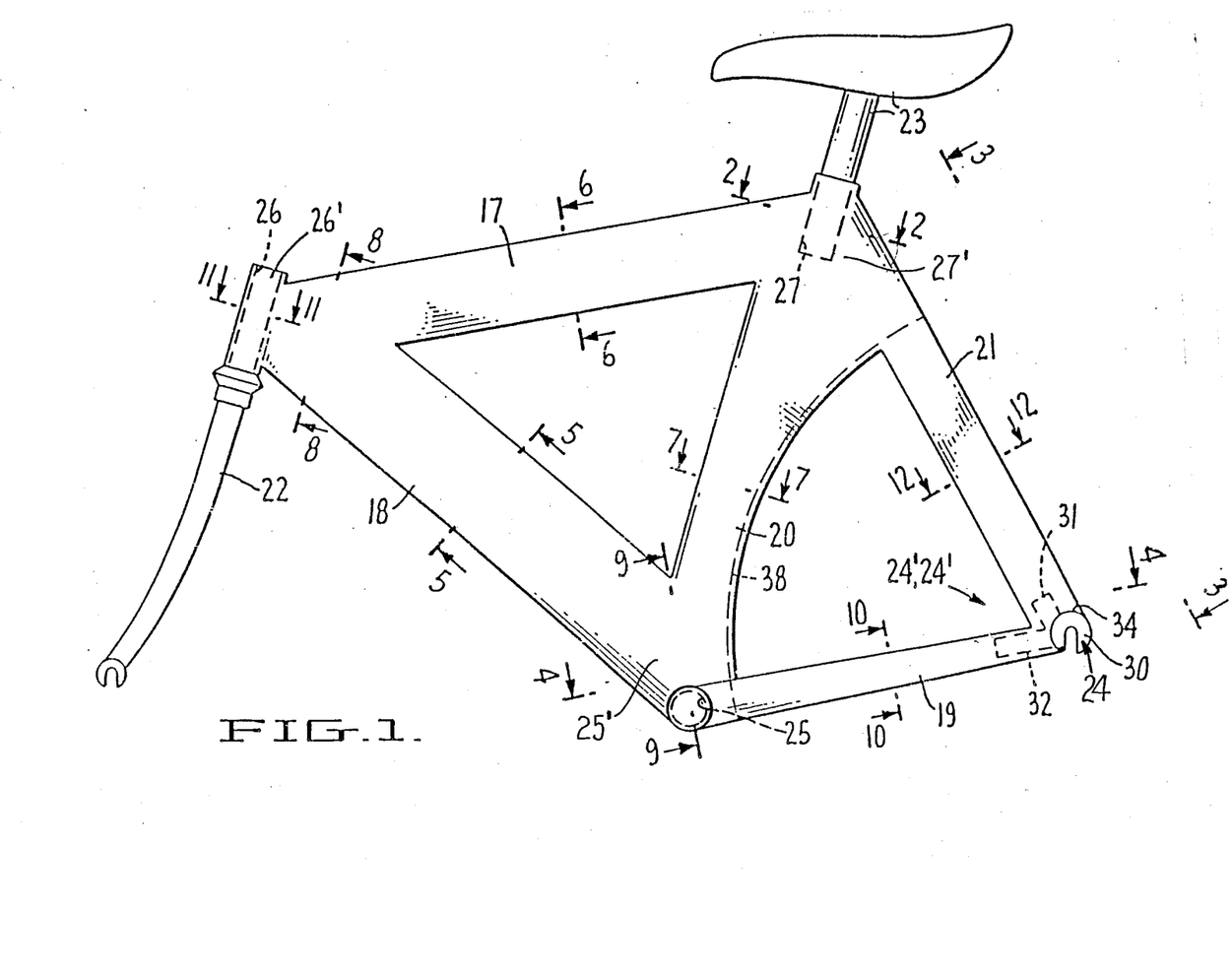
FIG. 1 is an elevational side view of a bicycle frame according to the invention.
Figure 2:
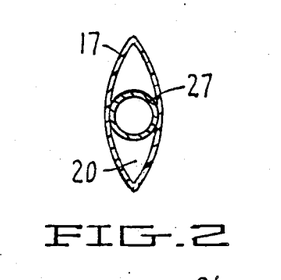
FIG. 2 is a sectional view of the hollow junction for supporting the seat support tube.

A bicycle frame constructed in accordance with the present invention is illustrated in FIGS. 1-12. With reference to FIG. 1, the basic components of the frame include a tubular top member 17 extending between and connecting a steering support tube 26 and a seat support tube 27, a tubular down member extending between and connecting steering support tube 26 and a pedal support tube 25, a tubular seat column member 20 extending between and connecting pedal support tube 25 and seat support tube 27, a pair of chain support stays 19—19 extending between and connecting pedal support tube 25 and a pair of corresponding rear dropouts 24—24, and a pair of tubular seat stay members 21—21 extending between and connecting seat tube 27 and the pair of corresponding rear dropouts 24—24.

The forward ends of the top member and the down member form a hollow junction 26' for carrying the steering support tube 26. Steering support tube 26 rotatably supports a front fork assembly 22 and a handle bar assembly (not shown). The rear end of top member 17 and the rear end of seat column member 20 form a hollow junction 27' for seat carrying support tube 27. Seat support tube 27 adjustably receives the post of a seat assembly 23. The forward end of seat column member 20 and the rear end of tubular down member 18 form a common hollow junction 25' which carries pedal support tube 25.

Figure 3:
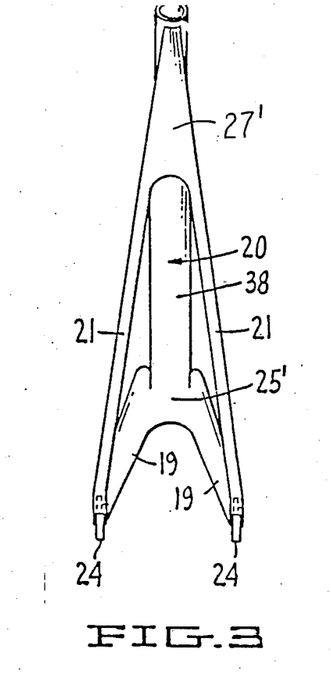
FIG. 3 is a rear perspective view of the bicycle frame.
Figure 4:
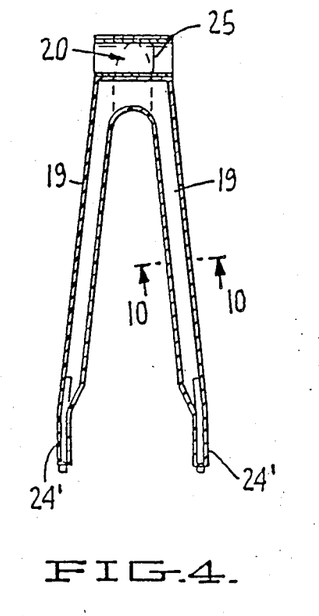
FIG. 4 is a sectional view of the bicycle frame taken along line 4—4 of FIG. 1.
Figure 5:
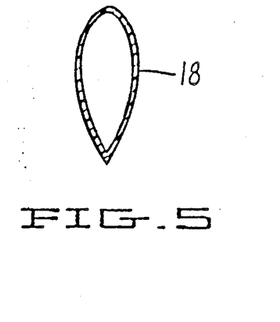
FIG. 5 is a sectional view of the down frame member taken along line 5—5 of FIG. 1.
Figure 6:
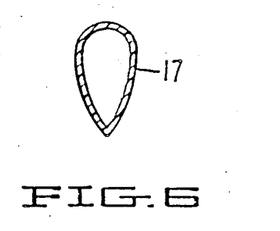
FIG. 6 is a sectional view of the top frame member taken along line 6—6 of FIG. 1.

As shown best in FIG. 3, junction 27' is connected to the forward ends of seat stay members 21—21 and junction 25' is connected to the forward ends of chain stay members 19—19. The rear ends of the seat stay member and the chain stay member corresponding to one side of the rear wheel assembly form one of two hollow common junctions 24'—24', and the rear ends of the seat stay member and the chain stay member corresponding to the other side of the rear wheel assembly form the other hollow common junction 24'. Each junction 24' carriers a slotted rear wheel dropout 24 which serves as an element for engaging a cooperative portion of the hub of the rear wheel assembly.

As shown best in FIG. 1, each rear dropout 24 has a head 30 and two legs 31 and 32 projecting from the head at an acute angle relative to each other. The acute angle between legs 31 and 32 corresponds to the acute angle between each chain stay member and the corresponding seat stay member. The leg 32 is embedded within and secured to, preferably by an adhesive, a rear portion of corresponding chain stay member 19, and leg 31 is embedded within and secured to, preferably by an adhesive, a rear portion of corresponding seat stay member 21. The adhesive is preferably an extra amount of the same epoxy resin as used to impregnate the fibrous material in making the tubular members of the frame.

The hollow junction 24' is preferably provided with a recess 34 for receiving head 30 of rear dropout 24. The recess 30 may be either cut out of a previously molded junction or molded as part of the junction when it is formed. When the recess is molded, the dropout preferably is placed in position after the frame material has been laid up but before the mold pieces are secured together. The shape of the molded recess preferably is such that the dropout would not move out of position even in the absence of adhesion to the junction between the corresponding seat stay member and chain stay member. The recess 34 thus provides a means for permanently and securely attaching each rear dropout to the corresponding chain stay member and seat stay member.

As previously indicated, the frame may be formed from any suitable material such as fiber reinforced plastic. In the case of fiber reinforced plastic, the thickness of the walls of the tubular members may be optimized in relation to stress loading by orientation of the fibers as previously explained. The entire frame is preferably formed as a single one-piece (unitary) structure of synthetic resin (plastic). In using either of these materials for the preferred unitary structure, each of the hollow common junctions are formed as one continous piece with the hollow tubular members joined thereby.

Figure 7:
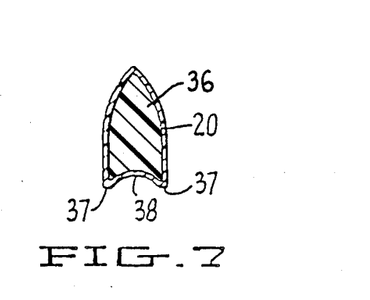
FIG. 7 is a sectional view of the seat column member taken along line 7—7 of FIG. 1.
Figure 8:
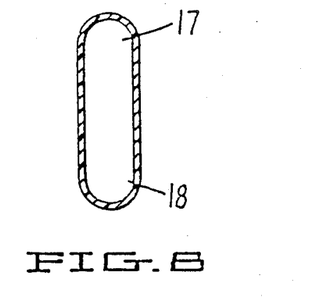
FIG. 8 is a sectional view taken along line 8—8 of FIG. 1 showing the junction between the tubular top member and the tubular down member.
Figures 9, 10:
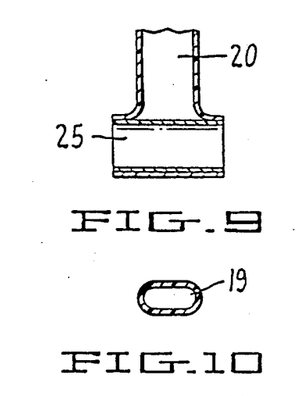
FIG. 9 is a sectional view taken along 9—9 of FIG. 1 showing the junction for supporting the pedal axle support tube.
FIG. 10 is a sectional view taken along line 10—10 of FIG. 1 showing one of the chain stay members.
Figure 11:
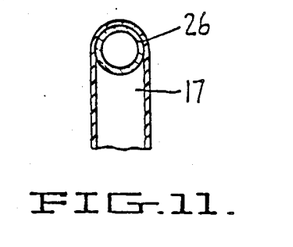
FIG. 11 is a fragmentary sectional view taken along line 11—11 of FIG. 1 showing a portion of the junction supporting the steering support tube.
Figure 12:
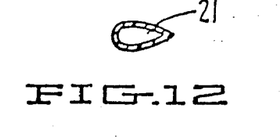
FIG. 12 is a sectional view of one of the seat stay members taken along line 12—12 of FIG. 1.

Although the cross-section of each of the tubular members may have a round aerodynamic shape, the tubular members preferably have the non-circular, airfoil type cross-sectional shapes illustrated in FIGS. 2, 5–8, and 10–12. Tubular members having any of these hollow cross-sectional shapes may be filled with a substantially rigid core of expanded and cured synthetic foam 36 as illustrated in FIG. 7.

A particularly important feature of the invention is that tubular seat column member 20 includes a pair of trailing edges 37—37 formed by a rear tube wall 38 that is curved longitudinally so as to follow substantially the circumference of the tire of the rear wheel assembly, and that is curved transversely to provide a concave cross-section with a shape that follows substantially the transverse outer periphery or outline of the tire of the wheel assembly. The transverse curvature of wall 38 preferably has a uniform radius, as does the preferred longitudinal curvature of wall 38.

Sufficient clearance is provided between the surface of rear tube wall 38 to permit free tire rotation without interference between the tire surface and tubular member 20. Similarly, the seat stay members and the chain stay members are spaced transversely apart by a distance sufficient to permit free tire rotation without contact between these members and the rear tire assembly.

What is claimed is:

1. A bicycle frame having a steering support means for rotatably supporting a front fork assembly for carrying handle bars and a front wheel assembly, a seat support means for supporting a seat assembly, a pedal support means for supporting a pedal crank and chain wheel assembly, and a rear wheel support means for supporting a rear wheel assembly, said frame comprising:

a hollow tubular top portion connecting and extending between said steering support means and said seat support means;

a hollow tubular down tube portion connecting and extending between said steering support means and said pedal support means;

a hollow tubular seat column portion connecting and extending between said seat support means and said pedal support means;

a pair of hollow chain stay portions connecting and extending between said pedal support means and said rear wheel support means; and, a pair of hollow seat stay portions connecting and extending between said seat support means and said rear wheel support means;

said top portion, said down portion and said seat column portion forming an open front triangle, said seat column portion, said chain stay portions and said seat stay portions forming an open rear triangle with one of said chain stay portions and a corresponding one of said seat stay portions on either side of said rear wheel assembly, said seat column portion providing a hollow common portion of said front and rear triangles and the outer edges of the other sides of said front triangle and the other two sides of said rear triangle substantially defining an outline of the geometry of said frame as viewed from one side thereof, said tubular portions being integrally united to form a hollow tubular bicycle frame having a unitary construction with two generally triangular shapes defined by said hollow portions and with said hollow common portion forming a side of each of said generally triangular shapes, said unitary construction being a continuous hollow shell without abutting joints;

and the members forming said rear triangle being integrally united to form a unitary frame portion having a hollow common junction between said seat column member and said pair of chain stay members, a hollow common junction between said seat column member and said pair of seat stay members, and a pair of hollow common rear junctions one on either side of said rear wheel assembly between a corresponding one of said pair of chain stay members and a corresponding one of said pair of seat stay members.

2. A bicycle frame having a steering support means for rotatably supporting a front fork assembly for carrying handle bars and a front wheel assembly, a seat support means for supporting a seat assembly, a pedal support means for supporting a pedal crank and chain wheel assembly, and a rear wheel support means for supporting a rear wheel assembly, said frame comprising:

a hollow tubular top portion connecting and extending between said steering support means and said seat support means;

a hollow tubular down tube portion connecting and extending between said steering support means and said pedal support means;

a hollow tubular seat column portion connecting and extending between said seat support means and said pedal support means;

a pair of hollow chain stay portions connecting and extending between said pedal support means and said rear wheel support means; and, a pair of hollow seat stay portions connecting and extending between said seat support means and said rear wheel support means;

said top portion, said down portion and said seat column portion forming an open front triangle, said seat column portion, said chain stay portions and said seat stay portions forming an open rear triangle with one of said chain stay portions and a corresponding one of said seat stay portions on either side of said rear wheel assembly, said seat column portion providing a hollow common portion of said front and rear triangles and the outer edges of the other two sides of said front triangle and the other two sides of said rear triangle substantially defining an outline of the geometry of said frame as viewed from one side thereof, and said tubular portions being integrally united to form a hollow tubular bicycle frame having a unitary construction with two generally triangular shapes defined by said hollow portions and with said hollow common portion forming a side of each of said generally triangular shapes, said unitary construction being formed as a continuous hollow shell without abutting joints and having a hollow common junction between said top portion and said down portion for carrying said steering support means, a hollow common junction between said down portion and said seat column portion for carrying said pedal support means, a hollow common junction between said top portion and said seat column portion for carrying said seat support means, and a pair of common hollow rear junctions one on either side of said rear wheel assembly between a corresponding one of said pair of tubular chain stay portions and a corresponding one of said tubular seat stay portions for carrying one of a pair of hub engaging elements of said rear wheel support means.

3. A bicycle frame according to claim 2 in which said seat column portion has a rear tube wall which longitudinally follows a smooth curve substantially parallel to the outer circumference of a tire of the rear wheel assembly and has a concave transverse cross-section substantially following the transverse curvature of the outer surface of said rear tire.

4. A bicycle frame according to claim 2 in which said seat column portion, said top portion, said seat stay portions and said down tube portion of the unitary frame each have aerodynamic cross-sectional shapes.

5. A cycle frame comprising a generally hollow unitary frame component extending longitudinally between and connecting at least two of a steering support means for supporting a fork assembly, a seat support means for supporting a seat assembly, a pedal support means for supporting a pedal assembly, and a wheel support means for supporting a wheel assembly; said generally hollow unitary frame component comprising:

at least two adjacent wall sections each comprising at least one molded layer of fibrous material impregnated with a synthetic resin; and, a pressure molded juncture of overlapping layers of said resin-impregnated fibrous material, said overlapping layers being provided by an edge portion of each of said adjacent wall sections and said pressure molded juncture integrally uniting said adjacent wall sections to provide a substantially continuous wall of said resin impregnated fibrous material around an interior cavity of said generally hollow unitary frame component.

6. A cycle frame according to claim 5 wherein said generally hollow unitary frame component comprises at least one generally hollow junction integrally united to at least one generally hollow tubular portion.

7. A cycle frame according to claim 5 wherein said generally hollow unitary frame component connects at least three of said support means and comprises at least two generally hollow tubular portions integrally united by a generally hollow common junction.

8. A cycle frame according to claim 5 for a bicycle wherein said generally hollow unitary frame component comprises a generally hollow top tubular portion extending between said steering support means and said seat support means, a generally hollow down tubular portion extending between said steering support means and said pedal support means, a generally hollow seat tubular portion extending between said seat support means and said pedal support means, a generally hollow common junction integrally uniting said top tubular portion and said down tubular portion and carrying said steering support means, a generally hollow common junction integrally uniting said top tubular portion and said seat tubular portion and carrying said seat support means, and a generally hollow common junction integrally uniting said seat tubular portion and said down tubular portion and carrying said pedal support means, said integrally united tubular portions and common junctions forming a generally hollow unitary front triangle component.

9. A bicycle frame according to claim 8 wherein said generally hollow unitary frame component further comprises a pair of generally hollow chain stay tubular portions extending between said pedal support means and said wheel support means and a pair of generally hollow seat stay tubular portions extending between said seat support means and said wheel support means, one end of each of said chain stay tubular portions being integrally united to said common junction carrying said pedal support means, and one end of each of said seat stay portions being integrally united to said common junction carrying said seat support means.

10. A cycle frame according to claim 5 for a bicycle wherein said generally hollow unitary frame component comprises a generally hollow seat tubular portion extending between said seat support means and said pedal support means, a pair of generally hollow chain stay tubular portions extending between said pedal support means and said wheel support means, and a pair of generally hollow seat stay tubular portions extending between said seat support means and said wheel support means, a generally hollow common junction integrally uniting said seat tubular portion and one end of each of said chain stay tubular portions and carrying said pedal support means, a generally hollow common junction integrally uniting said seat tubular portion and one end of each of said seat stay tubular portions and carrying said seat support means, and a generally common hollow junction integrally uniting the other end of each of said chain stay tubular portions and the other end of a corresponding one of said seat stay tubular portions and carrying a rear wheel support member of said wheel support means; said integrally united generally hollow tubular portions and common junctions forming a generally hollow unitary triangle component with one of said chain stay tubular portions and said corresponding seat stay tubular portion on either side of said rear wheel assembly.

11. A cycle frame according to claim 5 for a bicycle further characterized in that said generally hollow unitary frame component comprises a generally hollow top tubular portion extending between said steering support means and said seat support means, a generally hollow down tubular portion extending between said steering support means and said pedal support means, a generally hollow seat tubular portion extending between said seat support means and said pedal support means, a pair of generally hollow chain stay tubular portions extending between said pedal support means and said wheel support means, a pair of generally hollow seat stay tubular portions extending between said seat support means and said wheel support means, a generally hollow common junction integrally uniting said top tubular portion and said down tubular portion and carrying said steering support means, a generally hollow common junction integrally uniting said top tubular portion, said seat tubular portion and one end of each of said pair of seat stay tubular portions and carrying said seat support means, and a generally hollow common junction integrally uniting said down tubular portion, said seat tubular portion and one end of each of said pair of chain stay tubular portions and carrying said pedal support means, said integrally united tubular portions and common junctions forming a generally hollow main unitary frame component in which said top tubular portion, said down tubular portion and said seat tubular portion form an open front triangle, in which said seat tubular portion, siad chain stay tubular portions and said seat stay tubular portions form an open rear triangle with one of said chain stay tubular portions and a corresponding one of said seat stay tubular portions on either side of said rear wheel assembly, in which said seat tubular portion provides a common side of each of said front and rear triangles, and in which the outer edges of the other two sides of said front triangle and the other two sides of said rear triangle substantially define an outline of the geometry of said frame as viewed from one side thereof.

12. A bicycle frame according to claim 11 wherein said generally hollow unitary frame component further comprises a pair of generally hollow common rear junctions each integrally uniting the other end of one of said chain stay tubular portions and the other end of said corresponding seat stay tubular portion and carrying a wheel support member of said rear wheel support means, said integrally united tubular portions and common junctions forming an entirely integral one-piece frame.

13. A bicycle frame according to claim 12 wherein said steering support means includes a steering support tube, said seat support means includes a seat support tube, said pedal support means includes a crank axle support tube, and said wheel support means includes a pair of rear dropouts with one of said dropouts on either side of said rear wheel assembly, at least a portion of each of said tubes and dropouts being securely embedded in the resin impregnated fibrous material of said integral one-piece frame.

14. A bicycle frame according to claim 6 wherein said at least one generally hollow junction is integrally united to said at least one generally hollow tubular portion by said juncture of overlapping layers of said resin impregnated fibrous material, said juncture providing a substantially continuous frame wall of said resin impregnated fibrous material between said at least one junction and said at least one tubular portion.

15. A cycle frame according to claim 14 wherein the width of the overlap of said juncture is at least one half inch.

16. A bicycle frame according to claim 8 wherein each of said generally hollow junctions includes a portion of said juncture of overlapping layers, juncture portion providing a substantially continuous junction wall surrounding the interior cavity of the corresponding junction.

17. A cycle frame according to claim 5 wherein said pressure molded juncture is elongated in the longitudinall direction of said unitary frame component and the width of the overlap of said elongated juncture is at least one-half inch.

18. A cycle frame according to claim 7 wherein at least one of said generally hollow tubular portions has a non-circular aerodynamic cross-sectional shape.

19. A bicycle frame according to claim 9 wherein said seat tubular portion, said down tubular portion, and said seat stay tubular portions each have a non-circular aerodynamic cross-sectional shape.

20. A bicycle frame according to calim 9 wherein the interior cavity of at least one of said generally hollow tubular portions is filled at least in part by a separate core member comprising a foamed synthetic resin.

21. A bicycle frame according to claim 11 wherein the interior cavities of said seat stay tubular portions and said chain stay tubular portions are filled at least in parts by a separate core member comprising a foamed synthetic resin.

22. A cycle frame according to claim 5 wherein said frame comprises at least two molded layers of fibrous material impregnated with a synthetic resin.

23. A cycle frame according to claim 5 wherein said interior cavity extends substantially continously from at least one of said support means to another of said support means.

24. A cycle frame according to claim 5 wherein said fibrous material consists essentially of unidirectional fibers extending at angles in the range of 0°–45° relative to the longitudinal direction of said unitary frame component.

25. A cycle frame according to claim 24 wherein said generally hollow unitary frame component comprises a plurality of molded layers of said resin impregnated fibrous material, and the fibrous material in each of said layers consists essentially of unidirectional fibers, the unidirection fibers of different layers extending in different directions.

26. A cycle frame according to claim 24 wherein said generally hollow unitary frame component connects at least three of said support means and comprises at least two generally hollow tubular portions integrally united by a generally hollow common junction, and wherein the directions of the unidirectional fibers in one of said tubular portions are different from the directions of the unidirectional fibers in another of said tubular portions.

27. A cycle frame according to claim 5 wherein said generally hollow unitary frame component comprises two longitudinally extending and generally hollow tubular portions joined by a generally hollow common junction which integrally unites said generally hollow tubular portions to form said generally hollow unitary frame component.

28. The cycle frame of claim 5 wherein at least part of said generally hollow unitary frame component contains a foamed synthetic resin which provides a substantially rigid core for internal reinforcement of said at least part of said frame component.

29. A cycle frame according to claim 5 wherein said pressure molded juncture is elongated in the longitudinal direction of said unitary frame component and said pressure molded juncture integrally unites two sections of a generally hollow tubular portion of said unitary frame component to provide a substantially continuous wall of said resin impregnated fibrous material extending transversely around the generally hollow interior of said tubular portion.

30. A cycle frame according to claim 29 wherein said two sections form opposing parts of the wall of said generally hollow tubular portion.

31. A cycle frame according to claim 5 wherein said pressure molded juncture is elongated in the longitudinal direction of said unitary frame component and said pressure molded juncture integrally unites two sections of a generally hollow junction portion of said unitary frame component to provide a substantially continuous wall of said resin impregnated fibrous material extending transversely around the generally hollow interior of said junction portion.

32. A cycle frame according to claim 31 wherein said two sections form opposing parts of the wall of said generally hollow junction portion.

33. A cycle frame according to claim 14 wherein said frame component further comprises a second pressure molded juncture elongated in the longitudinal direction of said unitary frame component and said second pressure molded juncture integrally unites two sections of said generally hollow tubular portion and two sections of said generally hollow junction to provide a substantially continuous wall of said resin impregnated fibrous material extending transversely around the generally hollow interiors of said tubular portion and said junction.

34. A cycle frame according to claim 33 wherein said two sections of the tubular portion and said two sections of the junction form opposing parts of said substantially continuous wall of the generally hollow unitary frame component.

* * * * *

UNITED STATES PATENT AND TRADEMARK OFFICE
CERTIFICATE OF CORRECTION

PATENT NO. : 4,941,674

DATED : July 17, 1990

INVENTOR(S) : Brent J. Trimble

It is certified that error appears in the above-identified patent and that said Letters Patent is hereby corrected as shown below:

Column 11, line 17, change "siad" to --said--.

Column 12, line 17, change "parts" to --part--.

Column 11, line 62, after "layers," insert --said--.

Column 12, line 10, change "calim" to --claim--.

Signed and Sealed this

Twenty-eighth Day of January, 1992

Attest:

HARRY F. MANBECK, JR.

*Attesting Officer*  *Commissioner of Patents and Trademarks*